Sept. 22, 1964 J. COMTE 3,150,063
APPARATUS FOR EFFECTING CONTINUOUS INTERACTION BETWEEN
A DIVIDED SOLID AND A FLUID
Filed April 25, 1960 4 Sheets-Sheet 4
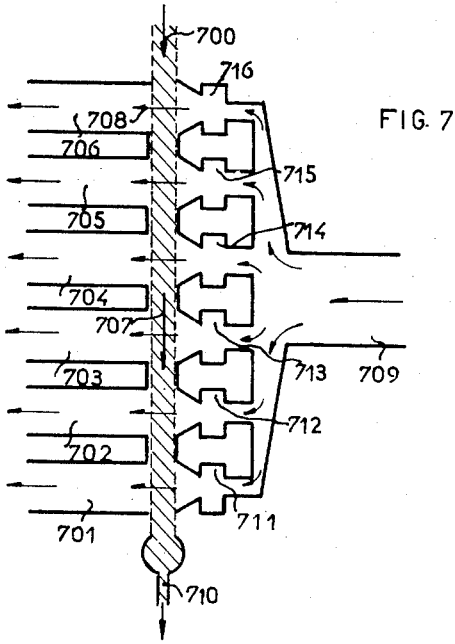
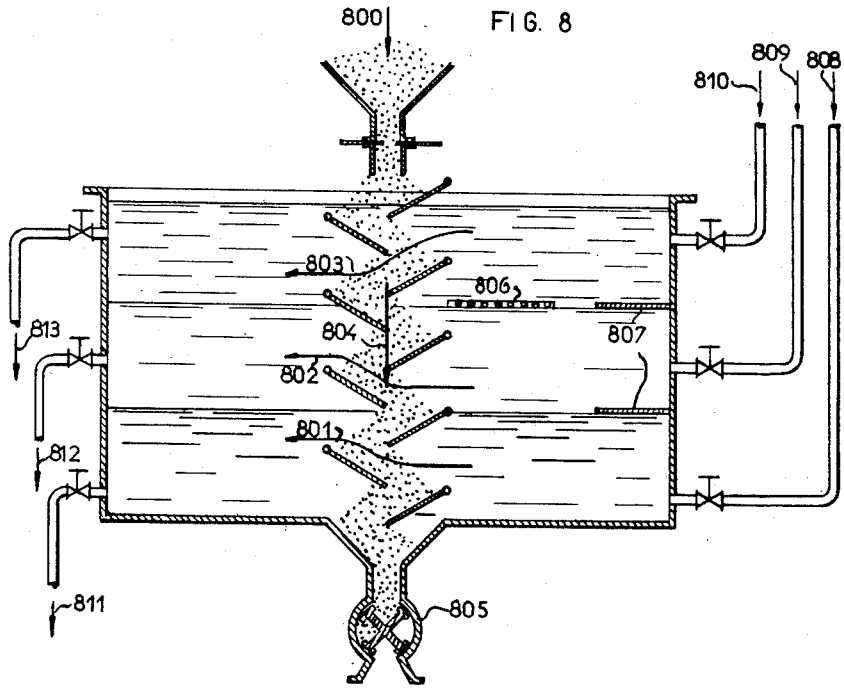

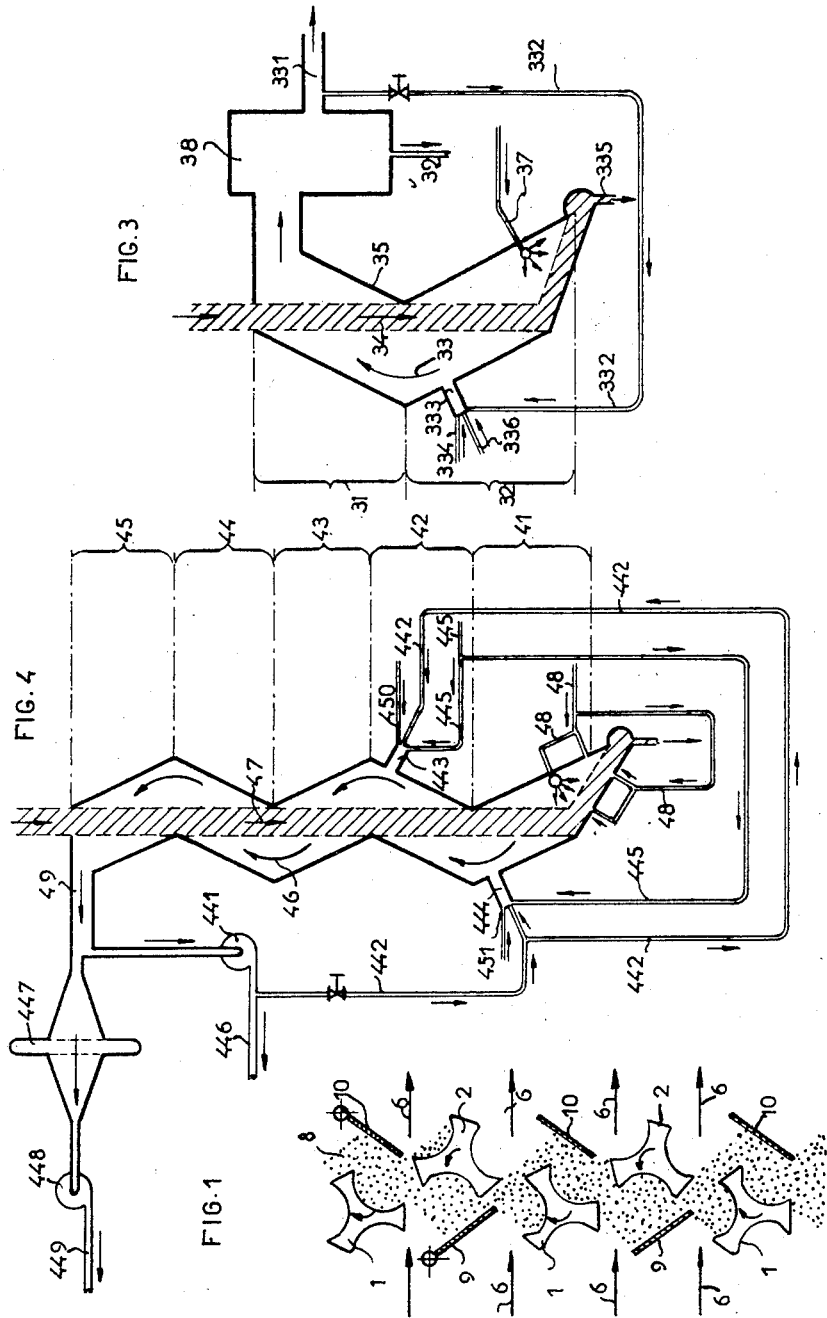

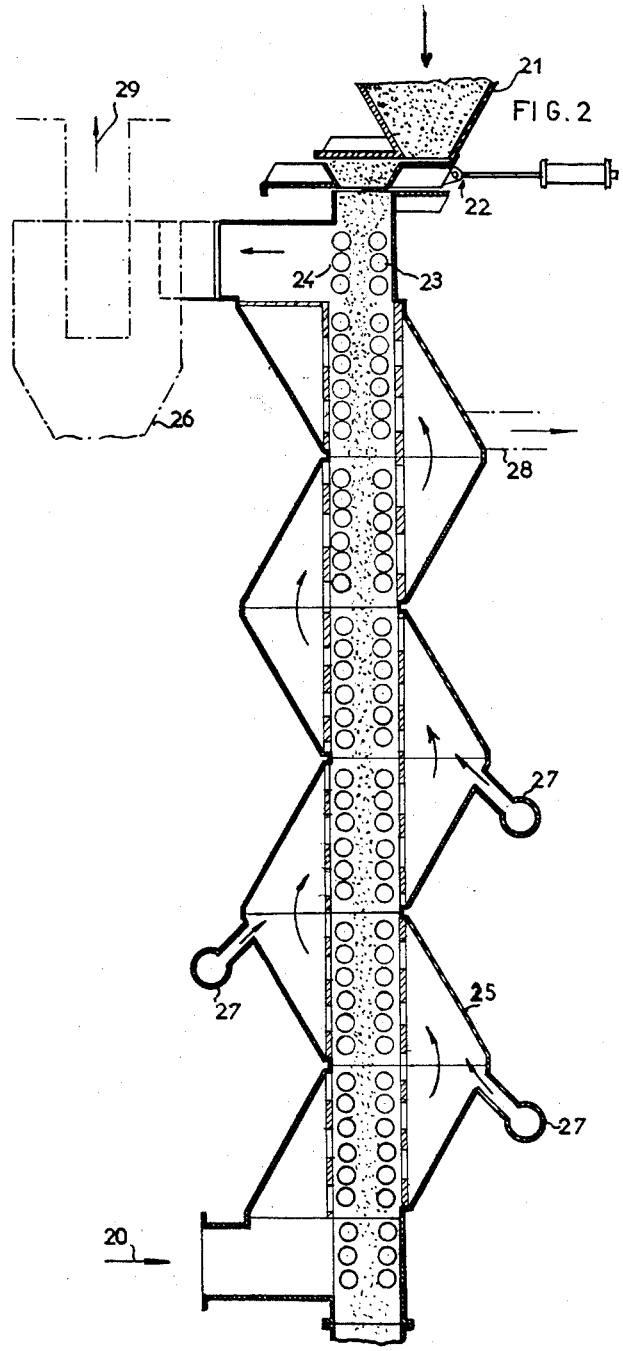

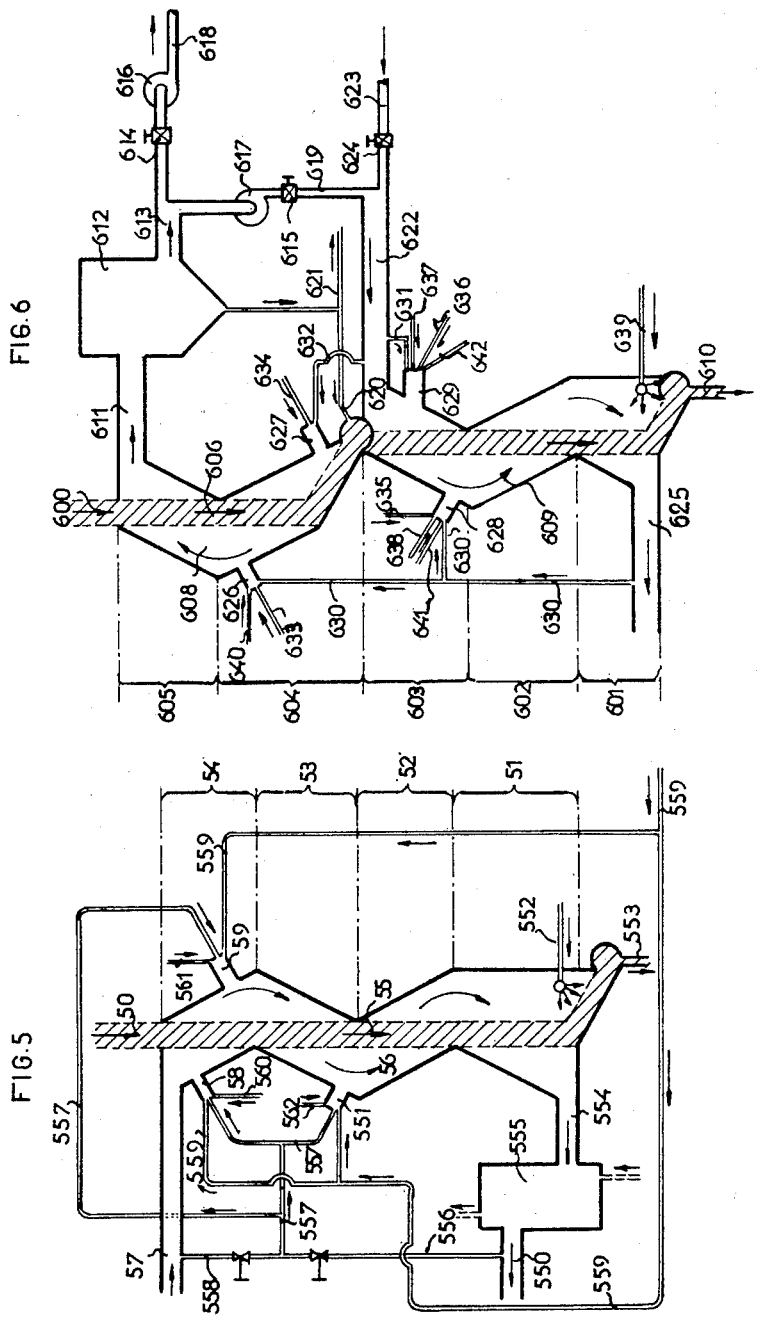

United States Patent Office 3,150,063
Patented Sept. 22, 1964

3,150,063
APPARATUS FOR EFFECTING CONTINUOUS IN-
TERACTION BETWEEN A DIVIDED SOLID AND
A FLUID
Jean Comte, Longeville-les-Metz, Moselle, France, assignor to Societe Alsacienne de Constructions Mecaniques Lorsid, Moselle, France, a company of France
Filed Apr. 25, 1960, Ser. No. 24,458
Claims priority, application France Apr. 23, 1959
2 Claims. (Cl. 202—120)

This invention relates to continuous processes in which a divided solid material is made to interact with at least one stream of fluid. The interaction between the divided solid material and the fluid may be of a physical or a chemical nature; the fluid may be liquid or gaseous.

Processes in which divided solid materials are required to interact with fluids to achieve some desired industrial result are extremely numerous in the chemical industry and other branches of engineering. In some processes the interaction may be a chemical reaction and both the solid and the fluid may then be converted to substances of modified chemical composition in such cases either the fluid effluent, or the modified solid material or both, may be of commercial importance. Examples of this class of processes include the pyrogenation or coking of coal, and similar reactions. In other cases the interaction may be more of a physical than a chemical character, as for example in distillation, lixiviation and similar processes. Again, either one or both of the effluent gaseous and discharged solids may be of commercial interest. In yet other instances, the divided solid material may be in the nature of a carrier for some reagent fluid material adsorbed or otherwise bonded thereon, for example in various catalytic processes.

It should be understood that the broad teachings of this invention are applicable to all of the various classes of solid-fluid interaction processes outlined above.

Objects of the invention include: performing such solid/fluid interaction processes in continuous form where it was heretofore found difficult or impossible to proceed continuously and thereby to improve the economy of the commercial processes involved and to provide greater economy and flexibility in the operation of continuous processes of the class specified. More specific objects are to provide improved methods and apparatus for use in continuous pyrogenation and coking of coal, distillation, lixiviation, cracking and other industrial processes involving an interaction between solids and fluids.

The invention, in one broad aspect, comprises a method of effecting continuous interaction between a divided solid material and at least one fluid, comprising passing said material downward through an enclosure in a generally vertical column at a controlled rate of descent, maintaining substantial permeability in said column of material throughout the vertical extent of said column, passing said fluid through the material in at least one flowpath intersecting said column at least one point thereof, and continuously discharging at least one of the products of the interaction of said solids with said fluid.

The above and further objects, features and advantages of the invention will become apparent as the disclosure proceeds with reference to the accompanying diagrammatic drawings, wherein:

FIG. 1 illustrates a type of downward flow rate control arrangement advantageously usable in the present invention;

FIG. 2 shows in simplified vertical section a treating plant according to this invention;

FIG. 3 similarly shows a pyrogenating plant;

FIG. 4 shows a modified pyrogenating or coking plant;

FIGS. 5 and 6 show further modifications;

FIG. 7 similarly shows a fractional distillation plant; and

FIG. 8 is a similar view of lixiviating apparatus according to the invention.

The arrangement illustrated in FIG. 1 of the accompanying drawings is one of the systems disclosed in my co-pending application for controlling the rate of descent of a column of divided material. While this particular arrangement is here illustrated and will be summarily described for facilitating the understanding of the present invention, it should be understood that various of the other modifications disclosed in the said application as well as other suitable arrangements, may likewise be used in the present invention. In the system shown in FIG. 1, there are provided two horizontally-spaced, vertical arrays of rotatable multi-vaned elements 1 and 2 respectively, the rotatable elements in each array being interspersed with inclined slats 9 and 10. The dimensioning and spacing of the various elements of the system are such that a body of divided material 3 fed downwards between the two arrays will rest upon the vanes and slats substantially at all times with its natural slope angle and will not tend to spill outwards of the column through the spaces between the elements. The three-vaned elements 1 and 2 revolve in the inward direction shown by the arcuate arrows so as to retain the material between the arrays. The rotation of the elements may be power-induced, or may be produced simply by the load of the material on them, in which case braking means may be provided for retarding the rotation of said elements. In either case the system provides for a controlled rate of descent of the material while enabling treatment of the material with a stream of fluid circulated transversely thereto as indicated by the arrows 6. At the same time the revolving elements achieve a mixing of the material as it descends, thus maintaining permeability in the solid material and promoting uniform and intimate contact thereof with the treating fluid.

The treating plant illustrated in FIG. 2 embodies a system of the general type just described and is suitable for any of various physical and/or chemical processes applied to divided solid materials, such as the full or partial distillation of non-coking coals, slaking of lime, and the like. In the system shown the material is fed from an overhead hopper 21 through a conventional metering device 22 which is here shown as comprising a horizontally reciprocable gate operated by a pressure fluid-actuator. The downward feed system is here shown schematically as the two vertical arrays of spaced elements 23, it being understood that this may be similar to the arrangement of FIG. 1, or of some other suitable type. This feed system is enclosed within a casing of sheet metal in the form of a sinuous or zigzag conduit 25 extending the full height of the system. This conduit has a bottom fluid inlet 20 through which treating fluid is introduced and an upper outlet 24 for the fluid. The conformation of conduit or casing 25 is such that the treating fluid is obliged to pass over a sinuous, upward flowpath intersecting the column of material fed down in between the two vertical arrays of spaced elements 23, alternately in either direction as indicated by the arcuate arrows. Auxiliary inlets are shown at various levels 27 connected with the conduit 28 and may serve for the input of any desired auxiliary fluids, e.g. air or steam for temperature-control or other purposes. Outlets may be provided at desired levels for tapping the fluid at any desired stage of the process and one such tap is shown at 28. The outlet 24 for the treated fluid effluent may be connected with a purifier tank as shown in dotted lines at 26.

In processes of the kind contemplated, where the treatment involves an application of heat, such as in distillation and coking processes for example, the heated fluid may be rather violently cooled as it contacts the fresh material entering at the top of the conduit 25. The less volatile constituents of the fluid are then deposited on the surfaces of the material together with any solid particles of dirt that may be suspended in the fluid. All these deposited constituents are then carried down with the descending column of solid material into the heat treatment area, in the intermediate or lower levels of the zigzag conduit, thus improving the effectiveness of the treatment and increasing thermal effectiveness of the treatment and increasing thermal efficiency. Moreover the fluid is at least partly purified at its outlet from the plant.

Owing to the reduction in volume which the material will usually undergo as the treatment proceeds, it will frequently be desirable to control the rotation of the rotatable elements of the feed-control system in such a way to impart a lower velocity to the material at the bottom than at the top of the system.

Where the treating or treated fluid is air or some other gas and it is desired to perform the treatment under sub- or super-atmospheric pressure, it will be understood that suitable sealing means would be provided for the input and discharge of the solid material. However, it will not generally be necessary to provide for a high degree of sealing tightness at the lower, discharge end of the system.

FIGS. 3 to 6 illustrate some modified systems according to the invention which are especially suitable for the coking and pyrogenation of coal and similar processes. While these particular applications of the systems are here referred to for the sake of concreteness it should be understood that the systems would be suitable for various other processes that will be understood by those familiar with the art. In the embodiments now to be described the descending column of solid material, such as coal, is shown schematically as a hatched area, and it will be understood that any suitable means, not shown, may be provided for ensuring a controlled rate of descent of this column of material while allowing it to be traversed by the stream of treating fluid. Such means may again assume the form shown in FIG. 1 or another comparable form.

In the pyrogenation or distillation of coal, the input ingredients of the process are coal, water, and air or oxygen, and the output includes a gaseous effluent and coke (and/or other solid pyrogenation residues). Heat is supplied to maintain the optimum temperature ranges in the system.

In the system shown in FIG. 3 the coal is fed downwards as indicated by arrow 34, and the gases are made to flow as shown by the arcuate arrow 33. The casing 35 is here in the form of a flat V standing on end so as to cause the gas flowpath to intersect the coal flowpath twice. There are thus defined two superimposed stages 31 and 32 in the process. The upper stage 31 is the zone in which the actual pyrogenation reaction occurs, while in the lower stage 32 the coked coal cools off. For the purpose of cooling the coal there is provided a water spray means near the bottom of the casing, the water inlet pipe being shown at 37. This spray generates steam which later reacts with the heated coal, and combustible gases are thus generated chiefly comprising a mixture of carbon monoxide and hydrogen, heat being absorbed in this process. Moreover, the excess steam which is mixed with the combustible gases promotes the condensation and separation of particles of dirt and tarry constituents. This condensation and separation occurs in the purifier device 38 connected with the upper fluid outlet of the casing 35. The products of condensation are discharged through a bottom outlet pipe 39 while the purified and cooled gaseous effluent is discharged through side outlet pipe 331. Part of this effluent is tapped through branch line 332 for controllably recycling it to burners 333 where it is mixed with air or oxygen applied through line 334 for supplying heat to the system. The burners 333 are further provided with an inlet 336 for a conventional fuel (such as gas, fuel oil, and/or condensation constituents discharged from the purifier outlet 39 for example). It will be understood that the supply of fuel is primarily necessary only for starting up the apparatus and may be partly or completely discontinued in operation, provided the gases introduced by way of the tap connection 332 have a sufficiently large heat content to supply per se the heat demand of the system. The burners 333 heat the column of coal 36 to the appropriate temperature range for the coking reaction. The cool coke is discharged at 335 by way of a mechanical extractor of any suitable type.

The modified apparatus shown in FIG. 4 is generally similar to that of FIG. 3, except that the treatment is here divided into five superimposed stages rather than only two. In this system as in the previous one the gases and coal flow in generally opposite directions as indicated by the arrows 46 and 47 respectively. In the lowermost stage indicated at 41 the coked coal is cooled by spraying with water delivered by a pipe 48. In the next higher stage 42 there occurs a cracking reaction in the pyrogenation products condensed on the coal in the stages above. In the next stage 43 the pyrogenation proper occurs. In the fourth stage 44 the heavier constituents in the treating gases condense on the coal. In the uppermost stage 45 the coal is preheated and the treating gas flow undergoes a primary de-dusting. It will be understood that the above processes have been described as proceeding separately for purposes of clarity, but that in actual practice the operations may carry over to some extent from one stage to another.

The gaseous effluent issuing at 49 may be discharged directly to the burners by means of a fan 441. It is found to be sufficiently pure and free of dirt, tarry constituents and fuel to allow its being directly used for heating purposes. Part of the effluent may be discharged by line 442 towards the burners 443 and 444. Oxygen-containing gas is supplied to the burners through a line 445 while auxiliary fuel may be fed to them through the lines 450 and 451 as described for FIG. 3. The remaining portion of the effluent gas is conveyed through line 446 to a point of disposal or storage. The effluent from 49 which is not used for heating is shown as being passed through a suitable unit 447 in which it undergoes thorough cleaning or filtering. From the filter unit 447 the gas stream may be delivered by a fan 448 and through line 449 to a point of storage or use, e.g. a set of combustion engines or gas turbines.

In the plant just described with reference to FIG. 4 the temperature of the coal fed into the top of the system may rise to about 130° C. as it passes through the top stage 45; it may reach about 530° C. on leaving the next stage 44, then about 750° C. at the outlet from stage 43, and may attain a maximum value of say about 950° C. at the outlet of stage 42. In the lowermost stage 42 the temperature decreases to about 130° C. due to the water spray before being discharged from the system.

Conversely, the gas flow which initially comprises a major proportion of steam generated by the water spray at the base of the tower may have an initial temperature of the order of 100° C. Its temperature may rise to about 180° C. after the first time the gas stream has crossed the vein of coal in stage 41. Then the action of the burners 444 may raise it to about 1300° C. and this temperature is substantially maintained throughout the stage 42 owing to the action of burners 443. The temperature may then decrease to say 600° C. between stages 43 and 44, and may decrease further for example to about 350° C. between stages 44 and 45. Finally the gases issue at 49 at a temperature of about 180° C. Thus, even though the reaction temperature may be of the order of about 1300° C. for the gas and about 950° C. for the coal, the gases are discharged from the apparatus at only about 180° C. and the coke at only about 130° C. This desirable result is obtained without having to provide any heat recovery system in the apparatus. The pyrogenation in this apparatus proceeds in a reaction medium comprising a stream of complex gases essentially comprising water-gas, steam and cracking constituents derived from the tarry and other condensed substances deposited on the coal in the upper stages. The combustible gas stream discharged from the apparatus is practically cool and clean, free of dirt and tar.

In the plant illustrated in FIG. 5, the coal and gas flow in concurrent directions as indicated by arrows 55 and 56 respectively, rather than in counterflow relation as in the foregoing embodiments. This system may be broken up into four superimposed stages respectively indicated by references 51, 52, 53 and 54. In the top stage 54 the coal introduced at 50 is heated by the burners 58 which may be fed make-up fuel through line 560, while the input gas to be enriched in the apparatus is delivered through inlet line 57. In the intermediate stages 53 and 52 the actual pyrogenation processes occur, due to the action of the burners 59 and 551, to which auxiliary make-up fuel may be fed through lines 561 and 562. The volatile constituents of the coal are discharged progressively throughout the pyrogenation zone. Simultaneously the heavier constituents undergo cracking in the stage 52. In the bottom stage 51 the coke is cooled by water spray delivered through line 552, and is discharged at 553. The gases containing water-gas formed by reaction of the coke and water issue out of the apparatus at 554 free from tar, more or less free from dust, and at a very high temperature. Their heat content may be recovered if desired in a heat exchanger 555. Combustible gas is delivered through lines 556 and/or 558 and passed by line 557 to the burners 58, 59 and 551, together with air (or oxygen) delivered by line 559 respectively to the burners 58, 59 and 551. The cool gases issue out of exchanger 555 through line 550 and are conveyed to the point of use. The heat exchanger 555 may be used for reheating any desired fluids as shown by the dotted flowlines.

The system shown in FIG. 6 constitutes a combination of the chief structural features shown in FIGS. 3, 4 and 5. It may be regarded as comprising five superimposed stages 601, 602, 603, 604 and 605. In the upper two stages 604 and 605 the coal and gas flow in counter directions as in the systems of FIGS. 3 and 4. In the lower three stages 601, 602 and 603 the coal and gas flow in concurrent directions as in the system of FIG. 5. The arrows 606 and 607 indicate the flow of coal and arrows 608 and 609 indicate flow of gas. The coal entering at 600 is conveyed in a descending column or vein throughout the stages by a system of the general character heretofore described, except that it is here shown as including a non-vertical, inclined section along the bottom of the stage 604. The solid residues resulting from full pyrogenation and gasification are discharged at 610. The effluent gas from the top of the plant at 611 is passed to a condenser 612 whence it is conveyed through a line 613 and a valve 614, by means of a fan 616 and an upper outlet 618 to a point of storage or use; or (selectively) by means of a fan 617, a gate 615 and a recycling line 619 back to the intermediate stages 603, 602 and 601. The condensate recovered at the base of purifier condenser 612 is directed through recycling lines 620 back to the lower stages 603, 602 and 601 there to undergo a further cracking treatment, or selectively by way of an outlet line 621 to a point of use.

Gas is supplied to the lower stages 603, 602 and 601 by way of a gas inlet line 622 connecting with the top of stage 603. Inlet line 622 is selectively supplied from the recycle line 619 previously mentioned, and/or from a source of fresh gas by way of an inlet 623 controlled by a valve 624. The effluent gas from the lower part of bottom stage 601 is discharged at 625.

Burners 626, 627, 628 and 629 are installed at suitable points for heating the reaction mixture. Primary fuel gas is supplied to the burners through the lines 630, 631 and 632 and secondary fuel is supplied thereto through lines 640, 641 and 642 respectively. The burners 628 and 629 are supplied with oxygen-containing gas through the lines 635 and 636, and with water vapor through the lines 638 and 637 respectively. Solid residues from the treated coal are cooled at the base of stage 601 by water spray delivered through line 639.

By suitable admission of oxygen and water vapor as just described a total gasification of the coal may, if desired, easily be achieved in the plant described. Depending on the proportions and quantities of oxygen and steam thus applied, the solid residues extracted from the system may comprise a more or less great proportion of carbon or coke. Thus depending on the selected operating conditions, the system described makes it possible to obtain high-purity, cool, rich, anhydrous effluent gas free of dirt and tar at the outlet 618, and/or hot enriched gases, free of tar and having a moderate moisture content at the outlet 625. The condensable constituents may if desired be recovered and/or subjected to additional treatment converting them into more volatile constituents.

The system shown in FIG. 7 is designed in accordance with the teachings of the invention for effecting a fractional distillation of divided solid or semi-solid materials (or non-solid material absorbed or absorbed on a divided solid carrier, e.g. a pumice carrier). The divided solid introduced at inlet 700 is conveyed downwardly through the system as indicated by arrows 707. A suitable fluid that is inert to the distillation products is discharged through the set of parallel outlets 701 through 706 which connect with the system at points vertically spaced along the column of treated material, substantially normally thereto. The flowpaths of the fluid indicated by the arrows 708 intersect the flowpath of the material to be distilled throughout the extent of the latter flowpath. The fluid is delivered from an inlet manifold 709 and distributed by suitable branch inlets as shown. At each level of fluid delivery the fluid is heated prior to its crossing the column of material to be distilled by suitable heating means diagrammatically indicated at 711 through 716 and which may assume any suitable form, such as electrical resistance heaters, burners, heat exchangers, or the like. The exhausted material is discharged through the bottom inlet 710.

The system shown provides for a progressive heating of the material to be distilled throughout its downward path, and makes it possible to collect simultaneously by means of the fluid outlets 701 through 706 all of the volatile fractions carried off with the fluid as it passes out of the material. This system is of especial advantage in the treatment of lignites and similar materials in which case the carrier fluid may be superheated steam.

The somewhat simplified system illustrated in FIG. 8 is designed according to the invention for the lixiviation of a divided material with one or more fluids simultaneously. The divided solids are introduced at inlet hopper 800 to the top of a downflow control system here shown as comprising two symmetrical sets of vertically spaced stationary inclined slats; it being understood however not some or all of the fixed slats may be replaced by rotatable vaned elements if desired. The lixiviated, exhausted material is discharged at the bottom of the tank through an outlet including a rotatable barrel type extractor 805 providing a substantially liquid-tight seal. In the example the descending column of solids is shown as being traversed by three streams of different solvents forming substantially separate layers in the tank. The solvents should for such purpose have sufficiently different densities to avoid substantial intermingling and emulsion therebetween, and be of such nature as to have a generally laminar flow through the tank. For assisting in this result, separator gratings such as 806 and flow-stabilizing baffles 807 may be provided. The fluids are introduced into the tank through inlet pipes 808 through 810 and the effluent fluids carrying dissolved constituents of the solid material therein are discharged through outlets 811 through 812. As an example, the three fluid layers 801, 802 and 803 may comprise (1) a heavy halogenated solvent such as trichloroethylene, perchloroethylene or the like, (2) water, and (3) a light hydrocarbon solvent such as benzene or toluene, respectively. Means may be provided for imparting different desired flow velocities to the fluids if desired. The velocity should not be so high as to induce turbulence.

In many embodiments of the invention, such as the last one described, it is necessary to provide some means for extracting the solid material after treatment while preventing the simultaneous withdrawal of fluid. While various conventional sealing extractor mechanisms may be satisfactorily used for this purpose, such as the vaned barrel extractor 805 of FIG. 8, one especially advantageous type is that comprising a modified screw or auger distributor device.

This device broadly comprises a horizontal rotatable screw or auger enclosed in a cylindrical casing or conduit which is angularly displaceable about its axis and is formed with at least one longitudinal slot or opening which permits discharge or solids every time the slot moves past a position vertically below the axis of the auger. By suitably controlling the rate of auger rotation and of casing displacement, the material may be discharged and distributed over a desired substantially uniform depth over a predetermined length of the conduit or casing between any two successive times at which the slot moves past its lowermost position.

It will be understood that the invention may be embodied in a wide variety of ways other than those illustrated and described herein as will be apparent to those familiar with the arts involved. For example, the system shown in FIG. 7 may be used for purposes other than distillation, for example for reacting the solids with one or more reagent fluids rather than treating it with an inert fluid as described above.

What is claimed is:

1. In a device for effecting continuous interaction between a divided solid material and at least one fluid, two horizontally spaced parallel arrays of vertically spaced flow control elements at least a number of which are constituted by equidistantly arranged multi-vaned rotatable flow control and stirring members, said arrays defining a substantially rectilinear vertical down-flow path for said material, means defining an enclosure surrounding said arrays and of zigzag shape for defining a zigzag flow path for said fluid relative to said down-flow path of said material, fluid inlet means at one end of said enclosure for continuously introducing said fluid into said fluid flow path to cause said fluid to flow in zigzag manner through said path and in alternating opposite transverse directions through said substantially rectilinear vertical material flow path in at least two superposed adjacent sections thereof; said enclosure being positioned externally of the down-flow path; material inlet means at the upper end of said material flow path for continuously introducing said material into the same, material outlet means at the lower end of said material flow path for continuously discharging therefrom the solid products resulting from said interaction between said material and said fluid, and fluid outlet means at the opposite end of said enclosure for continuously discharging therefrom the fluid products of said interaction.

2. In a device for continuous pyrogenation of a distillable divided solid material, two horizontally spaced parallel arrays of vertically spaced flow control elements at least a number of which are constituted by equidistantly arranged multi-vaned rotatable flow control and stirring members, said arrays defining a substantially rectilinear vertical down-flow path for said material, means defining an enclosure surrounding said arrays and of zigzag shape for defining an upward zigzag flow path for a combustible gaseous fluid, fluid inlet means adjacent the lower end of said enclosure for continuously feeding said combustible gaseous fluid into said fluid path defined by said enclosure to cause upward flow of said fluid in zigzag manner through said fluid path such that said fluid traverses said material in said vertical down-flow path in inclined manner in alternating opposite substantially transverse directions in at least two superposed adjacent sections thereof; said enclosure being positioned externally of the down-flow path; material inlet means at the upper end of the material path for continuously feeding said material into the same, material outlet means at the lower end of said material path for continuously discharging therefrom the solid products of said pyrogenation, and fluid outlet means at the upper end of said enclosure for continuously discharging therefrom the gaseous products of said pyrogenation, burning means for burning said combustible gaseous fluid within said enclosure at a location adjacent at least one of said sections of the material path, and auxiliary fluid means for injecting at least one auxiliary fluid into said enclosure at at least one level thereof.

References Cited in the file of this patent

UNITED STATES PATENTS

| 2,257,533 | Reich | Sept. 30, 1941 |
| 2,429,980 | Aullinson | Nov. 4, 1947 |
| 2,560,767 | Huff | July 17, 1951 |
| 2,613,138 | Van Loon | Oct. 1, 1952 |

FOREIGN PATENTS

| 169,847 | Great Britain | Oct. 13, 1921 |
| 90,154 | Australia | Nov. 25, 1922 |
| 372,405 | Germany | Mar. 27, 1923 |